May 7, 1968  J. HENRY-BAUDOT  3,382,385
ELECTROMAGNETIC CLUTCHES
Filed July 27, 1964  3 Sheets-Sheet 1

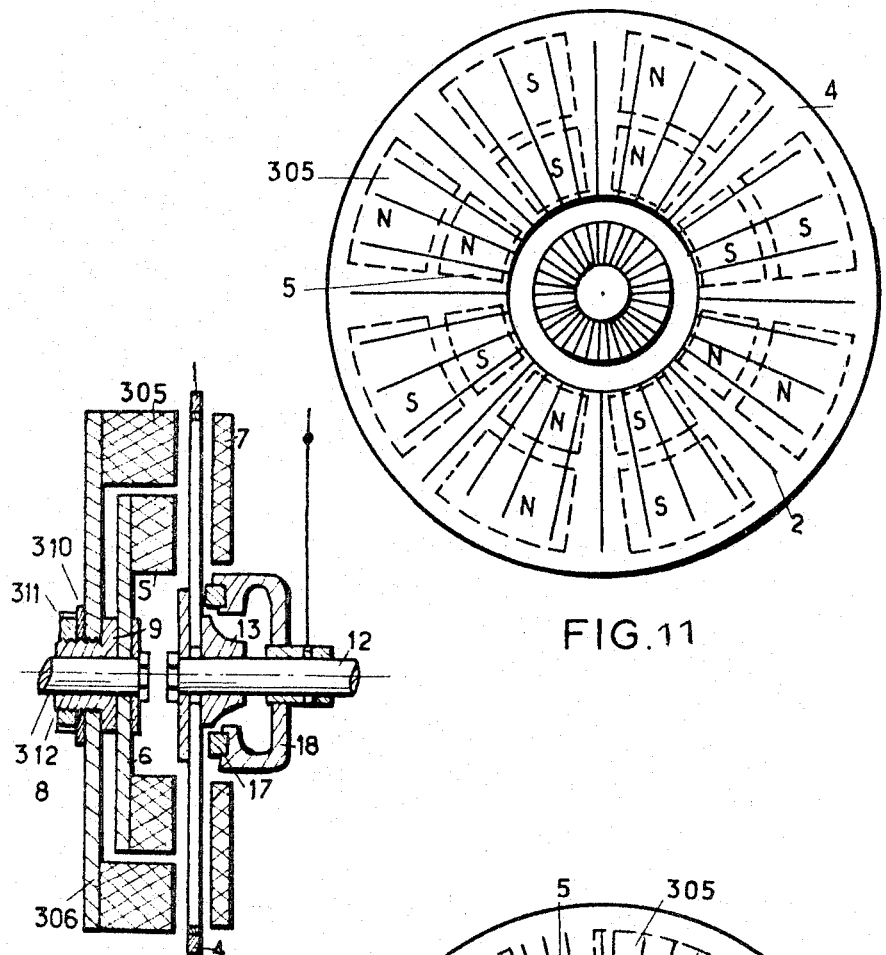
FIG.11
FIG.12
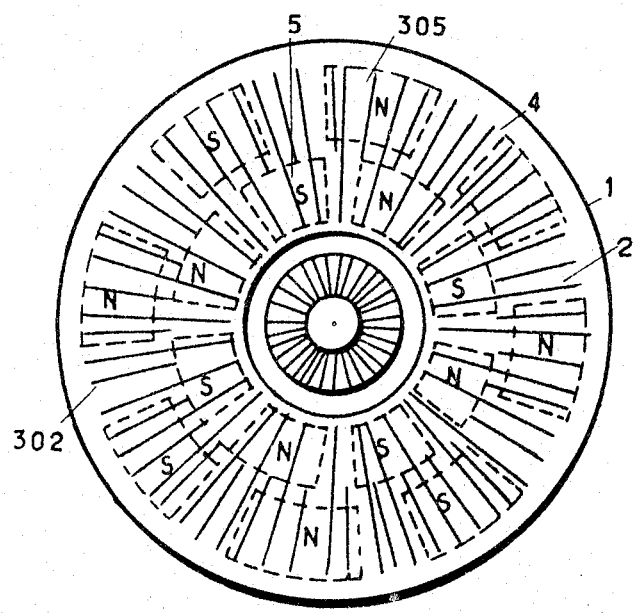
FIG.13

United States Patent Office 3,382,385
Patented May 7, 1968

3,382,385
ELECTROMAGNETIC CLUTCHES
Jacques Henry-Baudot, Antony, France, assignor to Societe d'Electronique et d'Automatisme, Courbevoie, France.
Filed July 27, 1964, Ser. No. 385,243
Claims priority, application France, Sept. 4, 1963, 946,578, Patent 1,375,230; Feb. 29, 1964, 965,668, Patent 85,373
15 Claims. (Cl. 310—94)

ABSTRACT OF THE DISCLOSURE

A variable electromagnetic coupling between shafts is provided by a heteropolar field structure carried by one shaft and defining a magnetic airgap and a rotor disc within the airgap and carried by the other shaft. The rotor disc is preferably slotted and means are provided to short-circuit the disc either in steps or continuously to vary the coupling and slip between the shafts in any desired manner.

---

The present invention concerns improvements in or relating to electromagnetic clutches, and consequently to brakes and differential dampers and the like, of the kind wherein the coupling between at least two shafts is effected without any recourse to a contact between mechanical parts but from the mere and sole electromagnetic coupling, or more exactly electrodynamic coupling of members separated by a narrow magnetic airgap.

In such devices, there is the possibility of slipping motion between the driving and the driven shafts and it is an object of this invention to provide such improved arrangements that such devices may work with a very small slipping motion and, when required and on the other hand, with a slipping motion which may vary between quite broad limits, step by step or continuously, without any risk of interruption of the coupling between the shafts.

According to a feature of the invention, a device of this kind comprises the combination of a heteropolar field structure affixed to a first shaft and defining a narrow magnetic airgap on same axis of rotation as said first shaft and of a rotor disc within said airgap affixed to a second shaft on an axis at least parallel to the axis of the first shaft, wherein said rotor disc is arranged to facilitate the formation of eddy currents therein in substantially radial directions. The field structure comprises a relatively high number of permanently magnetized poles of regularly alternate polarity around said field structure in a field ring facing at least part of the said rotor disc. With this arrangement when one of said shafts is rotated, it imposes on the other shaft a driving, respectively braking, torque of a value which is proportional to the induction effect to which the rotor disc is subjected from the magnetic flux of the field structure.

According to a further feature of the invention, the rotor disc is provided with a plurality of substantially radially extending slots and means are provided for controllably short-circuiting of the blades resulting from said slots to define the actual coupling coefficient between said slotted disc and the field member structure from the determination of preferential paths for the eddy currents in the disc. The maximum coupling coefficient is obtained by a complete short-circuit of the bars or blades corresponding to minimum slip between the shafts.

According to another feature of the invention, in order to vary the coupling and consequently the slip between the shafts in a progressive fashion, means are provided for collecting from the disc a direct current and adjusting the value of such dynamometric current by means of an adjustable electric load.

According to a further feature of the invention, the field structure comprises at least two concentric arrangements of permanent magnetic poles with means to adjust the relative angular position of the poles, whereby the coupling coefficient may be varied by modifying the damping of the rotor disc.

According to yet another feature of the invention, when using a multiple concentric field arrangement, the rotor disc is provided with different numbers of slots facing the arrangements, with a greater number of slots from the center to the periphery of said disc.

These and other features will be described in detail with reference to the accompanying drawings which illustrate preferred embodiments.

FIGS. 1 to 3 respectively are side elevations partially in section showing three alternative simple embodiments of the invention, the embodiment of FIG. 1 being adjustable only by a full or zero coupling, the second embodiment, FIG. 2, being one in which the coupling is adjustable in steps, and the embodiment of FIG. 3 being one in which the adjustment is continuous in character;

FIG. 11 shows in a front plan view a slotted rotor disc with the indication of two rings of permanent magnetic poles of a field structure, in order to obtain the embodiment shown in side elevation partially in section FIG. 12; and FIG. 13 shows a modification of the rotor disc of FIG. 11.

Figures 1, 2, 3:
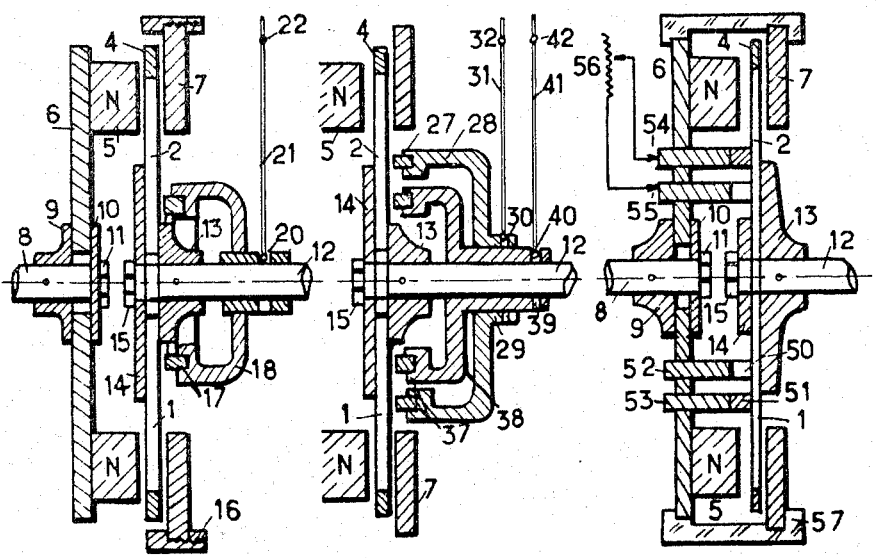

Referring to FIG. 1, a rotor disc 1 subject to eddy currents is affixed to a shaft 12 by means of a hub 13 on which it is mounted with a washer 14 and a nut 15. Said rotor disc 1 is placed within a flat annular magnetic airgap defined on one side by a ring of permanent magnets such as 5 which alternate regularly in magnetic polarity around the ring and affixed to an annular yoke plate 6. The yoke is secured to a shaft 8 by means of a hub 9, a washer 10 and a nut 11. The shafts 8 and 12 are coaxial and, as shown in this figure, their axes are coincident. They may be concentric with one sleeved around the other if desired. A magnetic plate 7 for the return of the magnetic flux is placed on the other side of the rotor disc 1 and defines therewith the annular magnetic airgap.

The number of magnetic poles is relatively high, and as an illustration, it is shown as eight. It might be advantageous to use a higher number of poles since the efficiency of the coupling essentially depends on the spatial configuration of the magnetic field within the airgap and the more such a heteropolar field has alternate zones of opposite directions of magnetic flux, the higher will be the efficiency, that is, the higher the coupling will be between the shafts and the lesser the slip for a predetermined width of the airgap. The lines of the eddy currents in the rotor disc will have an average configuration similar to that of the north and south magnetic poles but shifted by 90 electrical degrees with respect to the radial axes of said poles. The active parts of the eddy current lines are substantially radial and the passive parts are substantially circular along arcs of a span equal to a polar pitch of the field structure. When the rotor disc 1 is integral and homogeneous, the clutch will work under a very low slipping condition.

In order to better define the paths followed by the eddy currents in the rotor disc, where the disc is made of copper or aluminium for instance, the disc is provided with substantially radial slots and the number of slots is higher than the number of field magnetic poles (the number of slots is reduced in the drawings for the sake of clarity). The slots are preferably of uniform spacing around the disc. Preferably also the slots terminate short of the periphery of the disc to define a ring 4 acting as a short-circuiting member. The slots extend radially inward however to open into the central aperture of the disc. Illustratively, the short-circuiting ring 4 is shown at the outer periphery of the disc and the blades defined by such slots are separate up to the other inner periphery of the disc (see FIGS. 4 to 6 in this respect).

The coupling torque is reduced with such an arrangement and the slipping is correspondingly increased but, when it is required to obtain a maximum coupling coefficient and a minimum slipping value between the shafts, a short-circuiting ring is applied on the disc near the inner ends of the blades 3 defined by the slots 2. Such a short-circuiting ring is shown at 17 in FIGS. 1 and 4 and mounted on a cup 18 affixed to a sleeve 19 which may slide along the shaft 12. The sleeve includes a longitudinal groove 20, of circular shape, which houses a ball ending a rod 21 pivoted at a fixed point 22. The operation of said rod 21 permits the application of the short-circuiting ring 17 into electrical contact with the rotor disc 1 when required. In such an arrangement of the clutch, some degree of progressive adjustment may also be provided, if necessary, by mounting the magnetic plate 7 within a threaded sleeve 16, the outer edge of the plate 7 being also threaded, so that the airgap width may be relatively adjusted which obviously varies the magnetic coupling between the members of the clutch.

The return plate 7 is shown separate from the field structure in the arrangement of FIG. 1. It may however be secured to the rotating field structure as shown for instance in FIG. 3 wherein it is secured to a sleeve 57 connected to the yoke plate 6 of the field structure.

Instead of separate magnets with protruding poles, one may use a continuous ferrite ring of coercive property with the magnetic poles permanently magnetized therein.

As another variation, the return plate 7 may be replaced by a further magnetic pole ring similar to the field ring, with a shift of 180 electrical degrees from one pole ring to the other one, both rings rotating with the shaft 8.

If required, further, the rotor disc 1 may be stiffened by means of a stiffening ring glued to the peripheral edge thereof, such ring may be made from a folded edge of the short-circuiting ring 4. Another means for stiffening the rotor disc when required is to mount it on an insulating disc carrier. In the illustrated embodiments the carrier would be on the face opposite to that facing the magnetic poles 5. Such a disc may also be magnetic, either a magnetic insulating material or in a conducting magnetic material with an insulating film between the disc and the face of the rotor to which it is applied. In this later case, the return plate 7 may be omitted. Of course, such stiffening discs are of shorter radial length so as to leave the conductor blades of the rotor disc bare for application thereto of the short-circuit ring 17 when required. Such arrangements of stiffening discs have the disadvantage of increasing the inertia of the disc assembly affixed to the shaft 12.

Figure 5:
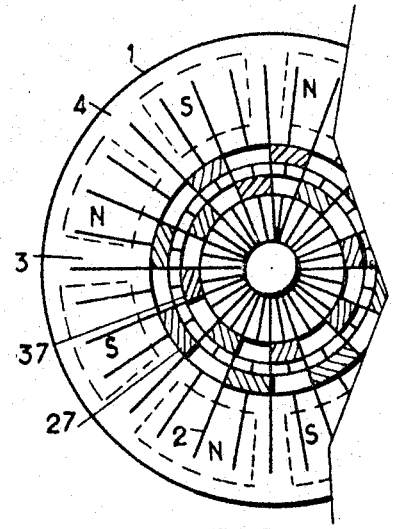
Figure 6:
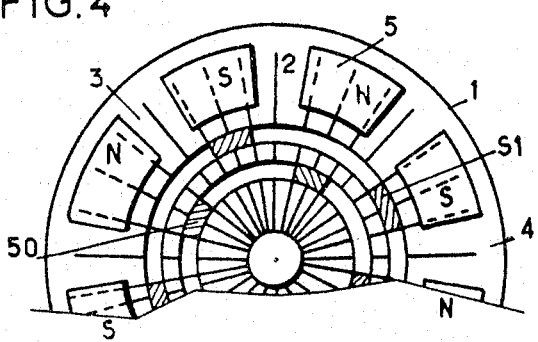

In order to provide a stepped control of the coupling coefficient, more than one member, and for instance two as shown in FIGS. 2 and 3 may be provided, each as a short-circuiting ring provided with indentations, FIGS. 5 and 6, such that only one half of the conductor blades 3 are short-circuited by one of said rings. Referring to FIGS. 2 and 5, the two rings 27 and 37 are concentric and respectively supported by carriers 28 and 38 terminating in sleeves 29 and 39. The sleeve 39 is mounted on the shaft 12 and the sleeve 29 over the sleeve 39. As for the sleeve 19 of FIG. 1, sleeve 39 rotates with the shaft 12 while capable of sliding along said shaft (for instance sleeve 39 is provided with an inner groove longitudinally extending along the shaft which is provided with a corresponding rib, such elements being not shown for the sake of simplicity). Similarly, sleeve 29 rotates with sleeve 39 while being capable of sliding along it. On the end of the sleeve 39 a circular groove is provided for housing an end ball of a rod 41 pivoted at 42 and on the sleeve 29 a circular groove 30 is similarly provided for housing the end ball of another rod 31 pivoted at 32. With such an arrangement, each sleeve may be independently brought forward to apply its short-circuiting ring to the rotor disc. Four steps of coupling are thus ensured.

The short-circuiting rings may, include a piling or stack of carbon washers or of other material known to present a resistivity which is a function of applied pressure, such pressure being adjusted by means of the levers 31 and 41. With such a modification, the stepped adjustment may be to some extent converted into a progressive one by variation of the pressure on the short-circuiting rings.

In devices according to the invention, the power dissipated in the rotor disc is proportional to the transmitted torque and to the slipping speed between the members of the clutch. In order to avoid undue rise of temperature in the rotor disc, it is desirable to ensure the dissipation of part at least of said power and, to this purpose, when necessary taps are provided for picking current from the disc. Such taps are conveniently placed on the pole axis of the field structure and rotate with said structure. They are distributed in two sets, each set connected to one end of a load resistance wherein the direct current is dissipated. Adjustment of the resistance provides a means for adjusting the electrical current in the disc and consequently the coupling and slip of the clutch.

Such taps may be individually established by as many brushes as there are poles, connected in two groups, one comprising the brushes placed on the axes of the north poles and the other one comprising the brushes placed on the axes of the south poles. The mechanical arrangement may be simplified when, according to the embodiment of FIGS. 3 and 6, each group of taps is made as a conductor ring, 52 and 53, with indentations the teeth of which 50 and 51 register with the axes of the north and south poles respectively, each tooth spanning at least over the width of two blades of the disc 3. Sliders 54 and 55 collect the current from the rotor disc 1 and apply it across an adjustable resistance 56. The value of said electrical current is determined by the value of the load resistance 56, hence the possibility of simultaneously adjusting the thermal dissipation and the value of the relative slip between the members of the clutch. It must be noted on FIG. 6 that the indentations of the current collector rings always leave some conductors open-circuited because a total short-circuit of the rotor disc would nullify the benefit and operation of the arrangement. Consequently, when an adjustment arrangement such as in FIG. 1 or in FIG. 2 is superimposed on the arrangement of FIG. 3, which is quite conceivable per se, the rings such as 17 or as 27 and 37 must not produce a total short-circuit of the disc.

Figure 7:
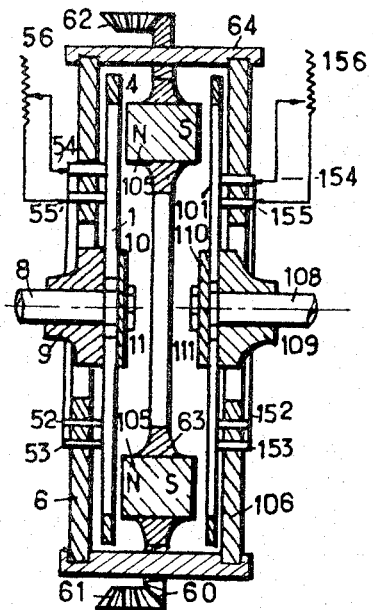
FIG. 7 is a side elevation partially in section and showing an embodiment which may be operated as a differential clutch.
Figure 8:
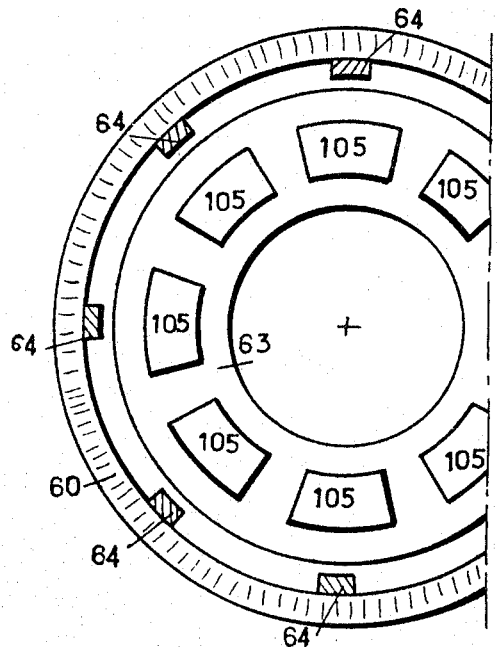
FIG. 8 is a partial plan view of the rotor of the embodiment of FIG. 7.

In the preceding embodiments, either shaft may be the driving one; however it is preferable that the driving shaft be the one carrying the field structure. From such structures may be derived a structure with two separate secondary (driven) shafts such as shown in FIGS. 7 and 8. The driven shafts are 8 and 108 and carry at their ends rotor discs 1 and 101. The driving shaft is orthogonal and ended by a toothed conical wheel 61 driving a toothed ring 60 surrounding a ring of permanent magnets 105 secured thereto by an annular plate 63. Both faces of the magnets are bare and, with the magnetic plates 6 and 106, they defined two annular magnetic airgaps for the rotor discs 1 and 101 which are for instance of the same kind as those of FIGS. 4 to 6. The rotor disc 1 is secured to the shaft 8 by the hub 9, the washer 10 and the nut 11, the rotor disc 101 is secured to the shaft 108 by the hub 109, the washer 110 and the nut 111. The magnetic plates 6 and 106 may be either fixed or, for instance, rotating with the magnets 105 as being secured to ends of struts as 64 passing through the plate 63 or the toothed range 60. Additional toothed pinions such as 62 may be distributed around the periphery of the toothed wheel 60 for a better guiding thereof.

The torque transmitted to each of the rotor discs is proportional to the relative slip between each disc and the driving magnet ring structure. In order to adjust said slips and also ensure a suitable thermal dissipation of heat from the discs, two current collector arrangements may be provided, each similar to the one of FIG. 3: indented rings 52 and 53 for the rotor disc 1 and indented rings 152 and 153 for the rotor disc 101, with adjustable load resistances 56 and 156 respectively, fed across the sliders 54–55 and 154–155. The indented rings must rotate with the field magnet structure and, for instance, may be carried by the magnetic plates 6 and 106 when rotating with the field structure, as shown.

Figure 9:
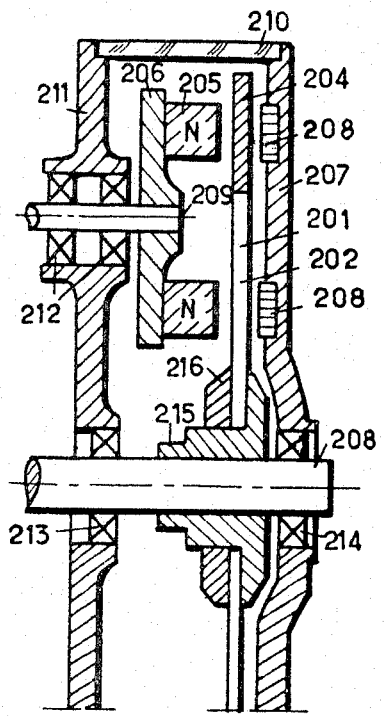
FIG. 9 is a partial side elevation of an embodiment of a speed reducer arrangement according to the invention.
Figure 10:
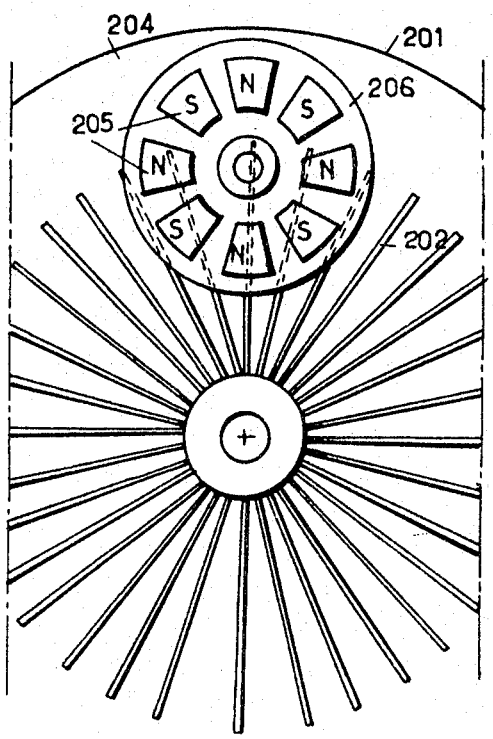
FIG. 10 shows a partial plan view of the embodiment of FIG. 9.

The axes of the field structure and of the conductor disc need not be identical, in view mainly of reduction or amplification transmission clutches. For instance, as shown in FIGS. 9 and 10, a rotor disc 201 may be carried on a shaft 208 by the hub 215 and the washer 216, threaded for that purpose, and a permanent magnet ring 205 on a yoke plate 206 may be carried on a shaft 209 rotating in bearings 212 mounted in a mounting plate 211 wherein the shaft 208 is also mounted in a bearing such as 213. A further mounting plate 207 is mounted by bearings such as 214 on the shaft 208; plates 211 and 207 are parallel and the plate 207 carries a magnetic annular member 208, for instance formed of a spiralled magnetic ribbon, facing the magnet ring 205. The rotor disc 201 is provided with substantially radial slots 202 short-circuited at their outer end by the annulus portion 204 the radial span of which is substantially equal to one-half of the diameter of the ring of magnets 205. When for instance, the shaft 209 is the driving shaft, the shaft 208 will be driven at a reduced speed of a value substantially equal to one-fourth of the speed of the shaft 209 for the shown example (the speed ratio is defined by the ratio of the mean radius of the magnet ring to the radius of the rotor disc to that mean distance from the axis of the shaft 208). The rotation torque developed on the shaft 208 is substantially equal to the torque applied to the shaft 209 divided by such a transmission ratio. When shaft 208 is the driving one, the reverse transmission multiplies the speed. Of course more than one shaft 209 may be associated with a single shaft 208, in a fashion similar to that described for the shaft 209.

Instead of a fixed annular member 208 in the mounting plate 207, one may provide a rotating magnetic member mounted on a shaft carried by said plate 207 or a ring of permanent magnets rotating on such a shaft; the rotation of such substituted member will be free for instance; such an arrangement may also be provided in the prior embodiments, if wanted, as a substitution for the magnetic plates fixed or secured to the rings of magnets.

Actually, for an arrangement such as shown in FIGS. 9 and 10, the function of the rotor disc is to present a portion of relatively lower resistivity in its outer part facing the higher half of the magnet ring and a portion of higher resistivity within said first portion. Instead of providing a single integral disc with slots, it may be of advantage to substitute a disc without slots but made with two distinct materials, the portion 204 being for instance made of copper or aluminum and the center of the disc being made of a silicon iron or another higher resistivity material. With such an arrangement, no adjustment could be made unless short slots be provided in the center portion of the disc for application thereto of short-circuiting rings as described for the previous embodiments.

It may be further noted that, in any embodiment of the rotor disc having slots therein, the slots may be filled with slabs of a material of higher resistivity than the material of the disc proper; such insert slabs may be made magnetic. Such an arrangement will add to the efficiency of the clutch.

Figure 4:
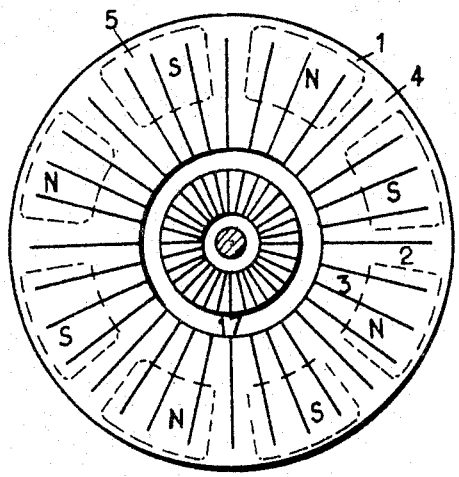
FIGS. 4 to 6 are plan views of the rotor discs of the embodiments of FIGS. 1 to 3 respectively with partial representations of their adjustment means.

In the embodiment of FIGS. 11 and 12, the rotor disc 1 is identical to the one of FIG. 4 and is secured to the shaft 12 in exactly the same way as shown in FIG. 1. For illustration, the adjustment is shown also similar to that shown in FIG. 1. The field structure however is modified in that it comprises two rings of permanent magnets 5 and 305 respectively secured to yoke plates 6 and 306. The magnet rings are concentric and the pole faces thereof are situated in the same plane for defining the magnetic airgap. The plate 306 is mounted on a threaded portion of the sleeve hub 9 and secured by means of a washer 310 and a nut 311 on a shoulder of said sleeve. The threaded portion of the hub is referred to as 312.

Normally, in the two rings of poles, the positions of the north and south poles are in register and their radial axes are coincident, see FIG. 11.

As a modification, FIG. 13, the rotor disc is provided with two sets of radial slots, the inner one being the same as shown in FIG. 11 and the outer one being of a greater number of slots as shown at 302, for instance by insertion of additional slots between the slots 2 extending substantially along the complete radial dimension of the disc, so that the inner set of slots substantially registers with the magnet ring 5 and the outer set of slots with the outer magnet ring 305.

When the two rings of magnets are coincident as shown in FIG. 11, the damping of the rotor disc is a maximum since the eddy currents pass directly from the two short-circuiting annuli, the inner one at 17 and the outer one at 4. When the outer ring 305 is shifted with respect to the inner ring 5, the eddy currents are proportionally reduced as part of any radial blade is the subject to an electromotive force and not the total blade. Illustratively, when considering the relative shift shown in FIG. 13, as only the blades situated in face of the same denomination poles are subjected to eddy current circulation, and as no eddy current exists in each blade part of which only is facing a magnet pole of either denomination, the overall eddy currents are reduced and the damping value is also reduced. When the magnet rings are brought in magnetic opposition of poles, the eddy currents are theoretically substantially eliminated. Residual currents however remain, which can be better eliminated with the arrangement of the rotor disc according to FIG. 13, from the increase of the number of slots towards the outer edge of the disc.

The transmission of motor torque between the driving and driven shafts is reduced as the damping of the rotor disc and consequently such an arrangement of the field structure and, also, of the rotor slots, enables an adjustment of the coupling coefficient between the members of the clutch.

Though this is not illustrated, it would be of advantage further to design the pole areas in the respective concentric rings so that they be equal from one ring to the other one in order to achieve a better equilibrium of the electromotive forces induced by the one and the other of said magnet rings in the conductor blades of the rotor disc. For instance, in this respect, the radial dimension of the magnets 5 and 305 may be made different. Of course, as said, the advantage is to provide a relatively high number of magnetic poles in any embodiment. In the latter one described, the higher the number of poles, the better will be the equilibrium of electromotive forces obtained without recourse to special pole shaping provision.

What is claimed is:

1. An electromagnetic induction clutch for coupling at least two rotating shafts comprising:

first and second shafts mounted for rotation on parallel axes;

a heteropolar field structure drive from said first shaft and defining at least one face of a narrow annular magnetic airgap;

at least one rotor driven by said second shaft and rotating at least partially within said airgap, said rotor including a plurality of slots substantially parallel to the greater linear dimension of said airgap and defining a corresponding plurality of electrically conductive paths;

a short circuit ring permanently connecting said conductive paths at one end thereof; and means for adjustably short-circuiting at least some of said paths at the ends thereof remote from said ring.

2. A clutch as defined by claim 1 in which the number of said conductive paths formed by said slots is substantially greater than the number of poles in said field structure.

3. A clutch as defined by claim 1 in which said rotor is disc-shaped.

4. A clutch as defined by claim 1 in which said short-circuiting means comprises a conductor ring slidably mounted with respect to said second shaft and positionable either in or out of electrical contact with said rotor.

5. A clutch as defined by claim 4 in which said conductor ring is formed at least in part of a material, the resistivity of which varies in accordance with applied pressure.

6. A clutch as defined by claim 1 in which said means for adjustably short-circuiting comprises a pair of concentric rings of conductive material, said rings each being slidably mounted on said shaft and selectively positionable in spaced relation to or in electrical contact with said rotor, said rings having teeth in staggered relation with each other so that each ring when in contact with said disc short-circuits less than all said conductive paths, but when both rings contact said disc, all conductive paths are short-circuited.

7. A clutch as defined by claim 3 which includes a plurality of brushes carried by said field structure and contacting said disc, the number of brushes being equal to the number of poles and said brushes being distributed in two groups in regular alternation to collect current from said disc, and a variable resistance load connected to said groups of brushes for adjusting the coupling and slip of the clutch.

8. A clutch as defined by claim 7 in which said brushes comprise concentrically arranged conductive rings having teeth on the rotor contacting faces thereof, said teeth being centered on the radial axes of the field poles, the circular extent of each tooth being less than one pole span of said field structure, and sliders contacting said rings for conducting current therefrom.

9. A clutch as defined by claim 3 in which said field structure includes at least two concentrically mounted rings of magnets and means for adjusting the angular position of said rings of magnets with respect to each other.

10. A clutch as defined by claim 9 in which said rotor has a larger number of slots facing the outer of said concentric rings of magnets than the inner one.

11. A clutch as defined by claim 9 in which the pole areas of the magnets of each ring are substantially equal.

12. A clutch as defined by claim 1 in which said slots in said rotor are filled with a material having a higher electrical resistivity than the material of said rotor.

13. A clutch as defined by claim 1 in which the axes of said first and second shafts are parallel but spaced from one another, the diameter of said field structure is smaller than the diameter of said rotor and so proportioned with respect thereto that substantially one-half of the field structure faces said short-circuiting ring.

14. A clutch as defined by claim 13 in which said rotor disc is imperforate and that portion between the center and the short-circuiting ring is formed of a material which is of higher resistivity than said short-circuiting ring.

15. A clutch as defined by claim 3 in which said magnetic field structure defines a pair of annular airgaps, a pair of rotor discs are disposed one in each gap respectively, and the axis of rotation of said field structure and said discs is concentric.

References Cited

UNITED STATES PATENTS

| 1,592,804 | 7/1926 | Young | 310—105 |
| 1,702,755 | 2/1929 | Weydell | 310—105 |
| 2,068,820 | 1/1937 | Sarazin | 310—105 X |
| 2,510,880 | 6/1950 | Fredrikson | 310—99 |
| 2,718,157 | 9/1955 | Schaub. | |
| 2,810,349 | 10/1957 | Zozulin | 310—105 X |
| 2,902,612 | 9/1959 | Whearley | 310—105 |
| 3,049,636 | 8/1962 | Stadelmann | 310—97 |

FOREIGN PATENTS

| 1,203,621 | 8/1959 | France. |

DAVID X. SLINEY, *Primary Examiner.*

UNITED STATES PATENT OFFICE
CERTIFICATE OF CORRECTION

Patent No. 3,382,385                      May 7, 1968

Jacques Henry-Baudot

It is certified that error appears in the above identified patent and that said Letters Patent are hereby corrected as shown below:

Column 7, line 11, "drive" should read -- driven --.
Column 8, line 10, the claim reference numeral "3" should read -- 1 --.

Signed and sealed this 25th day of November 1969.

(SEAL)
Attest:

Edward M. Fletcher, Jr.              WILLIAM E. SCHUYLER, JR.
Attesting Officer                    Commissioner of Patents